(12) United States Patent
Gonzalez Sanchez et al.

(10) Patent No.: US 10,885,466 B2
(45) Date of Patent: Jan. 5, 2021

(54) METHOD FOR PERFORMING USER PROFILING FROM ENCRYPTED NETWORK TRAFFIC FLOWS

(71) Applicants: NEC EUROPE LTD., Heidelberg (DE); TELEFONICA I+D, Barcelona (ES)

(72) Inventors: Roberto Gonzalez Sanchez, Heidelberg (DE); Claudio Soriente, Barcelona (ES); Nikolaos Laoutaris, Barcelona (ES)

(73) Assignees: NEC CORPORATION, Tokyo (JP); TELEFONICA I+D, Barcelona (ES)

( * ) Notice: Subject to any disclaimer, the term of this patent is extended or adjusted under 35 U.S.C. 154(b) by 773 days.

(21) Appl. No.: 15/486,318

(22) Filed: Apr. 13, 2017

(65) Prior Publication Data

US 2017/0330107 A1     Nov. 16, 2017

Related U.S. Application Data

(60) Provisional application No. 62/335,090, filed on May 12, 2016.

(51) Int. Cl.
*H04L 12/26*     (2006.01)
*G06N 99/00*     (2019.01)
(Continued)

(52) U.S. Cl.
CPC .............. *G06N 20/00* (2019.01); *G06N 20/10* (2019.01); *G06Q 30/0242* (2013.01);
(Continued)

(58) Field of Classification Search
CPC ......... G06N 20/00; H04L 67/02; H04L 67/22; H04L 41/16; H04L 43/026; H04L 43/12; G06Q 30/0242
(Continued)

(56) References Cited

U.S. PATENT DOCUMENTS

| | | |
|---|---|---|
| 6,412,000 B1 | 6/2002 | Riddle et al. |
| 7,366,174 B2 | 4/2008 | MacFaden et al. |

(Continued)

FOREIGN PATENT DOCUMENTS

KR     101103741 B1 *    1/2012

OTHER PUBLICATIONS

Este, A., et al., "Support Vector Machines for TCP traffic classification", 2009, Computer Networks 53, p. 2476-2490 (Year: 2009).*
(Continued)

*Primary Examiner* — Brandon S Cole
(74) *Attorney, Agent, or Firm* — Leydig, Voit & Mayer, Ltd.

(57) ABSTRACT

A method for determining an identity of a URL visited by a user from a vantage point in a network in which network traffic is encrypted includes determining a host to model, generating a list of URLs hosted by the host to model, repeatedly retrieving web resources referenced by the list of URLs hosted by the host to model and generating a network traffic signature upon each retrieval, generating a data feature for each of the generated network traffic signatures, and training, using the generated data features, a classifier corresponding to the host to model, wherein the classifier is configured to determine an identity of the visited URL from a signature of network traffic produced by the retrieval of a resource referenced by the visited URL.

20 Claims, 8 Drawing Sheets

(51) Int. Cl.
  *G06N 20/00*  (2019.01)
  *G06Q 30/02*  (2012.01)
  *H04L 29/08*  (2006.01)
  *H04L 12/24*  (2006.01)
  *G06N 20/10*  (2019.01)

(52) U.S. Cl.
  CPC ............ *H04L 41/16* (2013.01); *H04L 43/026* (2013.01); *H04L 43/12* (2013.01); *H04L 67/02* (2013.01); *H04L 67/22* (2013.01)

(58) Field of Classification Search
  USPC ...................................................... 706/1–62
  See application file for complete search history.

(56) References Cited

U.S. PATENT DOCUMENTS

| | | | |
|---|---|---|---|
| 9,106,536 B2* | 8/2015 | Christodorescu | H04L 41/142 |
| 2009/0063491 A1* | 3/2009 | Barclay | H04L 67/42 |
| 2018/0013639 A1* | 1/2018 | Sanders | H04L 41/16 |

OTHER PUBLICATIONS

Mackay, T. D., et al., "Classifying Internet Traffic Using Linear Regression", 2005, Proceeding of the International Conference on Computational Science and Its Applications—ICCSA 2005, Singapore, May 9-12, 2005, pp. 143-151 (Year: 2005).*

Roberto Gonzales, et al., "User profiling in the time of HTTPS", IMC '16 Proceedings of the 2016 Internet Measurement Conference, pp. 373-379, Nov. 14-16, 2016.

Andriy Panchenko, et al., "Website Fingerprinting at Internet Scale", Network and Distributed System Security Symposium, Feb. 21-24, 2016, pp. 1-15.

Juan Miguel Carrascosa, et al., "I Always Feel Like Somebody's Watching Me Measuring Online Behavioural Advertising", CoNEXT '15 Proceedings of the 11th ACM Conference on Emerging Networking Experiments and Technologies, article No. 13, Dec. 1-4, 2015, pp. 1-13.

"IAB internet advertising revenue report: 2015 full year results", Apr. 2016, pp. 1-30.

* cited by examiner

METHOD FOR PERFORMING USER PROFILING FROM ENCRYPTED NETWORK TRAFFIC FLOWS

CROSS-REFERENCE TO RELATED APPLICATION

Priority is claimed to U.S. Provisional Patent Application No. 62/335,090, filed on May 12, 2016, the entire disclosure of which is incorporated by reference herein.

STATEMENT REGARDING FUNDING

The work leading to this invention has received funding from the European Union's Seventh Framework Programme (FP7/2007-2013) under grant agreement no. 607728.

FIELD

The present invention relates to user profiling, and more particularly, to user profiling in a network in which traffic is encrypted.

BACKGROUND

A recent report of the Interactive Advertising Bureau US (IAB US) revealed that online advertising generated $59.6 B worth of revenue in only US in 2015, representing an increase of 20.4% with respect to 2014. This market size and growth allows online advertising to support more fundamental Internet services such as search, social media, and user generated content sites—some of which are at the forefront of innovation in Internet technologies.

A growing percentage of online advertising revenue is generated by Online Behavioral Advertising (OBA), in which user profiles are generated and personalized advertisements are served to users based on such profiles. Users are more likely to interact with personalized advertisements than with advertisements not related to their interests. Online user profiling is therefore a profitable business.

Online user profiling has traditionally been performed by service providers able to track users browsing among different web sites, e.g. Google and Facebook. However, in recent years network providers have become increasingly interested in monetizing the data carried by their networks. Comprehensive user profiles generated from such data can be used by network providers to allow them to join the online advertising market or can be sold to other parties. Online user profiling is now extensively carried out by various third parties including search engines, ad networks, and network providers capable of leveraging browsing activities to infer user interests and intentions.

Profiling systems often use a closed-source mapping between URLs and user interest categories. For example, previous work, such as that of Carrascosa et al. (J. M. Carrascosa, J. Mikians, R. Cuevas, V. Erramilli, and N. Laoutaris, "I Always Feel Like Somebodys Watching Me Measuring Online Behavioural Advertising," in *Proc. Of ACM CoNEXT* '15) has taken the approach of mapping URLs and user interest categories using the Display Planner of Google AdWords, an online tool that returns a set of user interest categories assigned by AdWords to a given URL and that also provides an inverse mapping, i.e., provides a list of websites that belong to a given user interest category.

With HTTP traffic, which has no privacy provisions, any third party can pry on the connections to a webserver and profile users. HTTPS enhances online user privacy by encrypting the communication between a browser and a webserver. Major internet stakeholders are pushing for an HTTPS everywhere web with the promise of increased security and privacy and, therefore, of mitigating the problem of user profiling by third parties. In this scenario, where user data has become a commodity, service providers have started protecting their data using encryption over HTTPS or other protocols like SPDY. Moreover, HTTP 2.0, which uses encryption by default, is expected to become the most used standard for web communications within a few years. The lack of visibility over the communication content severely inhibits the ability of network providers to accurately profile users.

SUMMARY

In an embodiment, the present invention provides a method for determining an identity of a URL visited by a user from a vantage point in a network in which network traffic is encrypted. The method includes determining a host to model, generating a list of URLs hosted by the host to model, repeatedly retrieving web resources referenced by the list of URLs hosted by the host to model and generating a network traffic signature upon each retrieval, generating a data feature for each of the generated network traffic signatures, and training, using the generated data features, a classifier corresponding to the host to model, wherein the classifier is configured to determine an identity of the visited URL from a signature of network traffic produced by the retrieval of a resource referenced by the visited URL.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5($b$) shows the Jaccard index between any pair of first level pages for the a website for a particular page sorting according to the execution of a method according to an embodiment of the invention;

DETAILED DESCRIPTION

Figure 1:
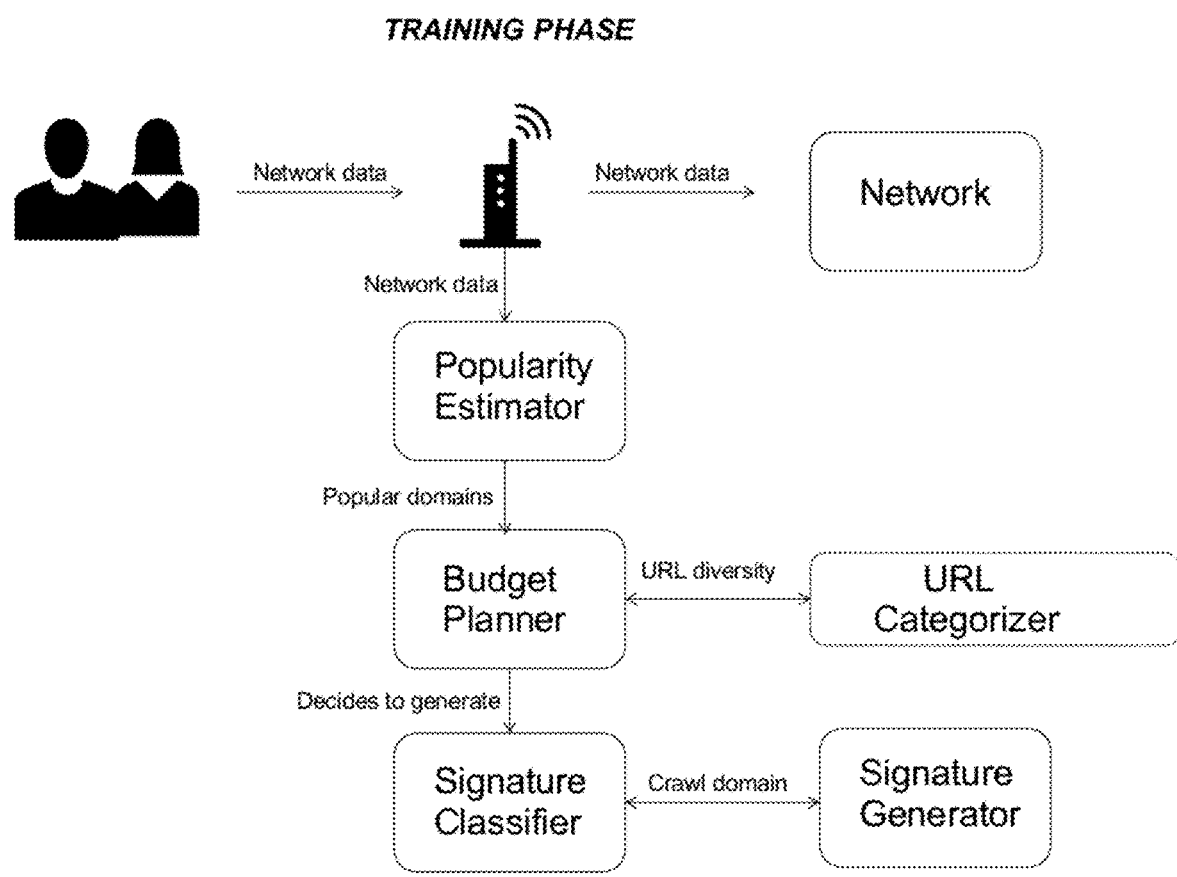
FIG. 1 depicts a schematic diagram corresponding to a training phase according to an embodiment of the invention.

HTTPS enhances HTTP with the Transport Layer Security (TLS) protocol. TLS provides a secure pipe to a server that is usually authenticated via an X.509 certificate. The secure pipe is established via a TLS handshake, a procedure that allows the client and the server to establish cryptographic keys to encrypt and authenticate data exchanged through the pipe. Given the ever increasing awareness on the privacy issues of the HTTP protocol, major web stakeholders are mandating secure (i.e., HTTPS) connections to serve their websites. Furthermore the ToR project and EFF promote the HTTPS Everywhere extension, which automatically redirects browsers to the HTTPS version of a website when available. This collective effort towards an HTTPS web has the main objective of increasing online privacy with respect to network eavesdroppers.

HTTPS ensures that a user is connected to the legitimate webserver and that the actual content of the exchanged information cannot be obtained by third parties. By employing strong cryptographic algorithms, TLS can effectively secure the transmitted information from network monitoring entities that want to obtain access to the actual transmitted content, e.g., read one's email or private messages. However, network monitoring entities may not care about the actual transmitted content but may instead care only about its type, e.g., if it is related to sports, politics, travel, etc. Obtaining information not about the actual content of pages visited by a user but instead merely about the type of content still allows a network monitoring entity to profile users, i.e., assign them tags (or categories), based on the URLs they visit. The tags can be drawn from a universe of tags and can define user interests. Identified interests of a user can then be monetized through targeted advertising and big data analytics.

The ability to track users within and across websites is the basis for profiling their interests, demographic types, and other information that can be monetized via targeted advertising and big data analytics. HTTPS has the capacity to interfere with the ability of anyone beyond the communicating endpoints to perform such user tracking using traditional methods.

However, it is possible to derive basic information for profiling purposed by knowing the domain that a user visits, either through the server name indication (SNI) of the transport layer security (TLS) protocol or through domain name system (DNS) analysis, especially for domains whose content is homogeneous. However, for domains carrying a variety of categories that depend on the particular page that a user visits, e.g., news portals, e-commerce sites, etc., merely knowing the domain that a user visits is insufficient for profiling purposes. Nevertheless, accurate profiling remains possible through transport layer fingerprinting that uses network traffic signatures to infer the exact page that a user is browsing, even when network traffic utilizes HTTPS protocol. As described herein, transport layer fingerprinting can be robust and scalable despite various hurdles, such as caching, dynamic content for different device types, etc, and user profiling can be performed even when network traffic utilizes the HTTPS protocol.

Server Name Indication (SNI) is an extension of the TLS protocol in which a client specifies a hostname with which it is attempting to connect in the client hello message, i.e. (the first message of a TLS handshake). The SNI extension is widely used by modern browsers and allows a server to serve multiple HTTPS websites, each with its own X.509 certificate, from the same IP address. The SNI extension thereby improves address-space utilization as it allows consolidation of HTTPS webservers at a given IP address. As described herein, the SNI extension can be utilized by third parties which monitor an encrypted connection between a client and an HTTPS webserver to determine user interests. However, SNI also hinders user privacy as it provides the domain requested by a user, despite HTTPS encryption. The SNI is sent in cleartext and can be obtained by any party monitoring network traffic between the client and the server.

Use of the SNI to profile users is particularly straightforward for websites with homogenous content across their pages. For example, a connection request to www.foxsports.com provides substantial information regarding user interests, regardless of the actual page within that website that the user is browsing. For a website with more variation across its pages, the domain requested by a user may not provide sufficient information regarding user interests. For example, a connection to www.amazon.com may not provide any worthwhile information about a user for profiling purposes. However a connection to www.amazon.com/books would reveal interests in books and a connection to www.amazon.com/baby may indicate an intent to purchase baby items. As described herein, by using fingerprinting techniques, accurate identification of the page a user is browsing within a domain is possible. Therefore, such fingerprinting techniques can be used to build a refined user profile.

As described herein, user profiling accuracy can be improved by using traffic fingerprinting to infer the exact page a user is browsing. Traffic fingerprinting is an active research area on techniques to infer information (such as a webpage visited over on an encrypted connection) solely by observing traffic patterns at the network/transport level. Traffic fingerprinting involves a training phase during which a network monitoring entity builds a fingerprint of each monitored page. Building such fingerprints can be accomplished by fetching the monitored pages multiple times and recording features of the generated traffic, e.g. packet size, inter-arrival times, etc. Thereafter, a network monitoring entity can extract the same features from a client's traffic and attempt to match the client trace to a fingerprint computed during the training phase. Differences between the training data and the client data due to, e.g., different routes or congestion, can be mitigated using statistical methods.

In order to fingerprint the websites under observation for user profiling purposes, large amounts of bandwidth are required. However, if bandwidth is limited, websites can be periodically selected for monitoring according to a method described herein for increasing the number of users that are correctly profiled over time.

As described herein, a user profile can be correctly generated from a vantage point in a network even when traffic is encrypted, for example, using HTTPS. As further described herein, a system can obtain signatures of network traffic in a first centralized phase and can use machine learning techniques to classify the traffic in an on-line fashion.

In an embodiment, a method is provided for correctly profiling users from a vantage point in a network in which network traffic is encrypted, for example, with HTTPS. The method includes analyzing the popularity and diversity of hosts visited from a network vantage point to determine certain hosts to model, generating a classifier for each host using signatures generated by repeatedly visiting the URLs belonging to the hosts under study, identifying when a user is visiting one of the URLs hosted by one of the hosts for which a classifier has been generated, and applying the generated signature to the classifier to obtain a final URL.

In an embodiment, a system is provided for accurately profiling users from a network vantage point in which network traffic is encrypted, for example, with HTTPS. The system includes two different subsystems: a training subsystem for performing a training phase that is in charge of generating a classifier for the most common hosts, and an on-line subsystem for performing an on line phase that generates signatures for users' traffic and that assigns a category using a URL determined by the classifier. The vantage point from which the system profiles users can be any point at which an operator of the network or a third party has the ability to observe network traffic. For example, the vantage point from which the system profiles users can be a router or set-top box located at a user premises or a server or other equipment located in a network core—such as a packet data network (PDN) gateway (P-GW) or a serving gateway (S-GW) in an LTE network.

FIG. 1 depicts a schematic diagram corresponding to a training phase according to an embodiment of the invention. The training phase subsystem, which is depicted in FIG. 1, is the most expensive part of the system and is in charge or generating classifiers for different hosts. To this end, it is composed of several parts that can be designed independently. A general design according to an embodiment of the invention can be observed in FIG. 1. The training phase subsystem can be a processor or a processor module or a plurality of processors or processor modules configured to execute processor executable instructions. Such processors or processor modules could be located at a server or other equipment located in a network core, for example a packet data network (PDN) gateway (P-GW) or a serving gateway (S-GW) in an LTE network. Such processors or processor modules could also be located at a computer, server, or other equipment connected or connectable to a network core. Such processors or processor modules that form the training phase subsystem could also be distributed between multiple such locations. Such processors or processor modules could be configured to read a non-transitory computer readable medium having instructions stored thereon for determining an identity of a URL visited by a user from a vantage point in a network in which network traffic is encrypted, and to execute the stored instructions.

The training phase subsystem includes a Classifier Generator that takes signatures from different URLs hosted within a host and generates a model, or classifier, for that host that will be used in a subsequent phase. The Classifier Generator can be a processor or a processor module configured to execute processor executable instructions. The classifier for a host determines an exact URL visited by a user based on a signature of network traffic produced by the user's visit to the URL. The classifier can be a processor or processor module or a plurality of processor or processor modules configured to identify a URL from a signature of network traffic produced by the retrieval of a resource referenced by that URL. Specifically, the classifier can be a processor or processor module configured to execute an algorithm that has been trained specifically to identify an exact URL visited by a user from a signature of the network traffic that is produced by the user's visit to the exact URL. The classifier can be a version of the one created in (PANCHENKO, Andriy, et al. Website Fingerprinting at Internet Scale. En Proceedings of the 23rd Internet Society (ISOC) Network and Distributed System Security Symposium (NDSS 2016). 2016.) where identification of the domain visited by a user is performed. The Classifier Generator creates different classifiers for the hosts of a single domain, instead of the generating an Internet scale model. This important change, first, reduces the complexity of the Classifier Generator itself, and second, improves the accuracy by allowing identification of the exact URL visited inside a domain, and thereby makes it possible to identify the domain in other ways.

The Classifier Generator uses, as input, a list of signatures that are related to sizes of the packets sent and received when a user visits a single URL hosted by a particular host of a particular domain. For example, each signature can include the size of incoming packets to a host and outgoing packets from a host and the order in which the incoming and outgoing packets are received at a particular vantage point. In addition, signatures can also include a timestamp for each of the incoming and outgoing packets (which could be used, for example, to generate interarrival times for each of the incoming and outgoing packets) as well as information pertaining to packets directed to or originating from other third party domains such as content delivery networks (CDNs). The Classifier Generator can generate a feature, i.e. a data sequence obtained from an observation of a user's visit to a single URL, from each of the signatures by considering incoming packets to a host as having positive sizes and outgoing packets from a host as having negative sizes. Here, each feature is a set of positive and negative numbers, ordered according to the time at which they are received by a particular vantage point, that can be interpreted as a curve. Visits to different URLs can produce features of different sizes (resulting from different numbers of packets transmitted to and from a host). Then the classifier can standardize the generated features so obtain standardized final features by interpolating the resulting curves to obtain a fixed number of points per each repetition of a URL visit and apply a max min normalization of the resulting data. Interpolating the curve resulting from the set of positive and negative numbers that make up a feature allows for the representation of different features having different sizes by vectors having a uniform size. The Classifier Generator subsequently uses the aforementioned final features to train a classifier for a particular host. The classifier can be trained using standard machine learning techniques such as Support Vector Machines (SVM). However, depending on the accuracy requested it could also use other techniques, e.g. Linear Regression.

In order to obtain the necessary signatures, the Classifier Generator uses the Signature Generator. The Signature Generator can be a processor or a processor module or a plurality of processors or processor modules configured to execute processor executable instructions. The Signature Generator is in charge of first, visiting an index page of a host for which a classifier is to be generated (which can be referred to as a host to model) in order to obtain a list of URLs hosted by the host to model, e.g. a list of URLs that exist in the first level of the web page graph, and thereby obtain the links that can be visited by users. Then, the Signature Generator repeatedly visits the URLs in the list by using the most common browsers (or simulating them) and logs the packets sent and received in order to generate a signature for each visit to each of the URLs in the list. Specifically, the Signature Generator can log the packets sent and received in order to obtain information related to those packets that is used to produce the signatures, e.g. the packet sizes and directions as well as the interarrival time between packets.

The Signature Generator and the Signature Classifier can, by themselves, generate classifiers for any host of any domain on the web. However, use of the Signature Generator and the Classifier Generator is very costly since the Signature Generator visits a large number of URLs several times thereby consuming network and computational resources in the process and since the Classifier Generator creates models that are computationally expensive. Thus, it is not feasible for the Signature Generator and the Signature Classifier to generate a classifier for every host on the current Internet. Therefore, the training phase subsystem can further include a Budget Planner that determines the hosts for which a classifier is to be generated and how often the classifiers should be updated, or renewed.

The Budget Planner, which can be a processor or a processor module or a plurality of processors or processor modules configured to execute processor executable instructions, can take into account at least three different variables, which include the popularity of the host, the costs associated with the generation of a classifier for the host (including both the bandwidth expended by the Signature Generator and the computational power expended by the Classifier Generator), and the diversity of the categories of the URLs hosted by the host. The popularity of the hosts impacts the number of times the corresponding classifier will be used. The statistics needed to identify the most popular hosts and domains can be obtained from a current network analyzer (e.g., deep packet inspectors, proxies, etc.) or by collecting data from a network using a capturing device. The diversity of the categories of the URLs hosted by the host is relevant since the final goal is to profile the user. It is not necessary to know if the user is visiting two URLs with the same categories (e.g., www.games.com/game1 and www.games.com/games2 will result in assigning the same interest to the user, i.e. games). However, it is necessary to classify those hosts that host pages pertaining to different categories (e.g., www.bbc.com/politics will result in assigning a politics interest to the user but www.bbc.com/sports will assign a sports interest). In addition, the frequency with which a particular web host under study is updated can also be taken into consideration (as some webpages change everyday while others are more stable over time, the age of a classifier for a particular host can be more significant for some hosts than for others). The Budget Planner can solve an optimization problem that accounts for the impact of such variables on the accuracy of user profiling and that aims to maximize the number of interests correctly assigned to users.

Finally, in order to obtain needed information, the Budget Planner utilizes a Popularity Estimator that identifies the most popular hosts contacted from a vantage point in the network, and a URL Categorizer that, given a URL, returns the interests associated with it. The Popularity Estimator and the URL Categorizer can each be a processor or a processor module or a plurality of processors or processor modules configured to execute processor executable instructions. Categorization can be done by using Natural Language Processing over the web page or with other existent systems. As an example, (CARRASCOSA, Juan Miguel, et al. I Always Feel Like Somebody's Watching Me: Measuring Online Behavioural Advertising) uses the campaign planner of Google AdWords to infer the interests associated with different URLs. Moreover, a more intensive version of this phase (including the creation of classifiers for thousands of pages) can be periodically executed in order to update some of the statistics needed by the Budget Planner.

Figure 2:
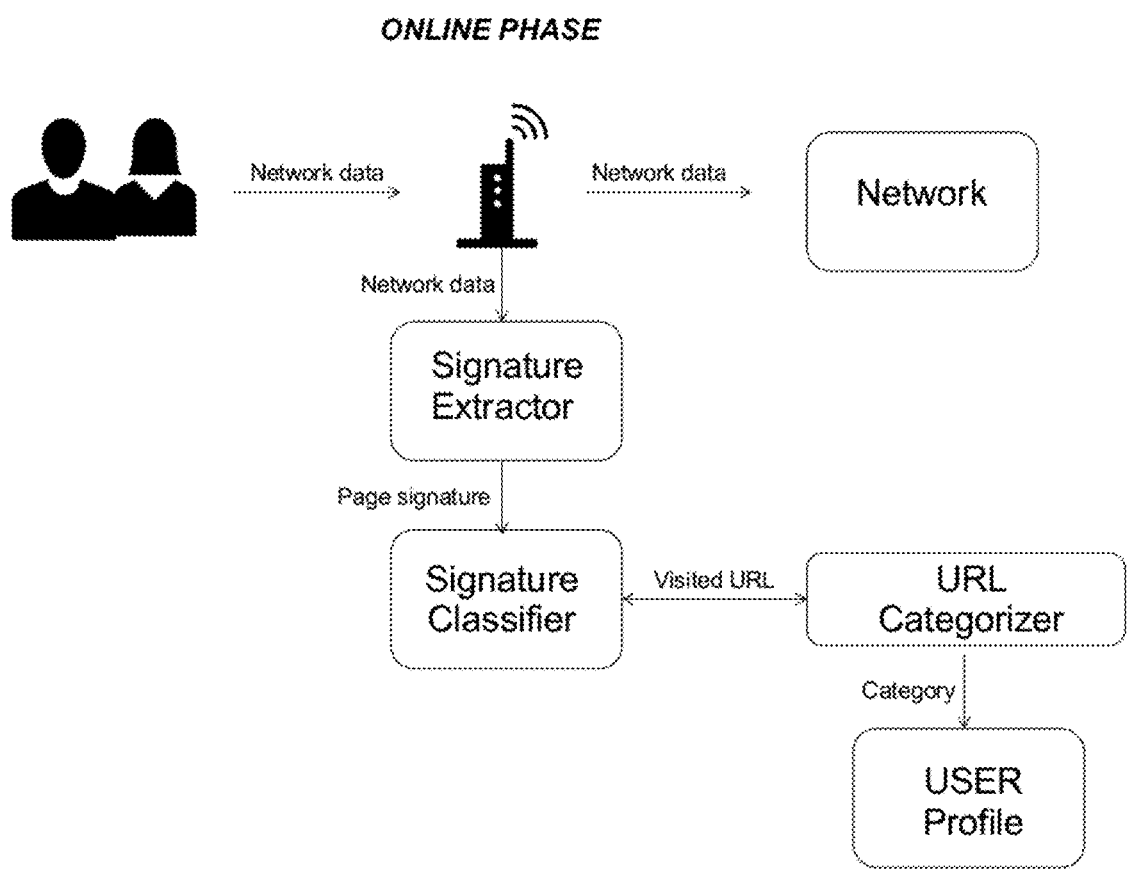
FIG. 2 depicts a schematic diagram corresponding to an online phase according to an embodiment of the invention.

FIG. 2 depicts a schematic diagram corresponding to an on-line phase according to an embodiment of the invention. The on-line phase subsystem is in charge of assigning interests to users. The online phase subsystem will run in a network vantage point that can be the same as the network vantage point of the training phase or another network vantage point aggregating a smaller number of users. For example, the network vantage point at which the online phase subsystem will run can be a user's router or equipment of the network operator located at the edge of the network, e.g. a network edge device. Nevertheless, the network vantage points of the training phase subsystem and the online phase subsystem should be located in the same geographical region since web pages can be personalized for a specific geographic location and therefore a classifier generated for a different geographic location may be ineffective. The online phase subsystem can be a processor or a processor module or a plurality of processors or processor modules configured to execute an algorithm comprising the steps described in more detail herein below. The online phase subsystem can be located at the network vantage point of the online phase subsystem, can be located in any machine with access to users' traffic, or can be distributed between multiple locations. Such processors or processor modules could be configured to read a non-transitory computer readable medium having instructions stored thereon for determining an identity of a URL visited by a user from a vantage point in a network in which network traffic is encrypted, and to execute the stored instructions.

In the embodiment depicted in FIG. 2, a first step is performed when a Signature Extractor detects a connection from a user to one of the hosts for which a classifier has been generated. The Signature Extractor can be a processor or a processor module or a plurality of processors or processor modules configured to execute processor executable instructions. The detection of a connection from a user to a host for which a classifier has been generated can be done by intercepting DNS requests, by storing a list of IP addresses related with hosts for which a classifier has been generated (which can be referred to as modeled hosts), or by reading SNI information in HTTPS packets. The Signature Extractor can create a signature for a visited webpage in a similar manner that the Signature Generator creates a signature for each visit to a URL during the Training Phase. The Signature Extractor can be configured to directly capture network traffic, e.g. by using a capturing device. Once the network traffic has been captured, the network traffic can be split into different domains in order to obtain packets related to every connection. Thereafter, the signature can be generated using, e.g., the same process employed during the training phase. Each signature can include the size of incoming packets to a host and outgoing packets from a host and the order in which the incoming and outgoing packets are received at a particular vantage point. In addition, signatures can also include a timestamp for each of the incoming and outgoing packets (which could be used, for example, to generate interarrival times for each of the incoming and outgoing packets) as well as information pertaining to packets directed to or originating from other third party domains such as content delivery networks (CDNs).

The signature generated by the Signature Extractor is sent to the Signature Classifier. The Signature Classifier can be a processor or a processor module or a plurality of processors or processor modules configured to execute processor executable instructions. The Signature Classifier can be a collection of classifiers generated by the Classifier Generator of the training subsystem. The Signature Classifier is configured to infer an exact URL that was most likely visited by a user from a signature generated by the signature extractor. Once an exact URL is identified by the Signature Classifier, the URL Categorizer determines a user interest category that corresponds to the exact URL identified by the Signature Classifier and the USER Profiler assigns the user interest category to a user profile. The determination of a user interest category and the assigning the user interest category to the user profile follow standard techniques for providing the interests associated with a URL from the URL Categorizer and adding it to a user profile.

The systems and methods of the present invention allow for a number of benefits. The systems and methods of the present invention allow for generation of accurate user profiles using encrypted network traces by identifying the URL visited by the users using signatures generated from the size of the encrypted traffic packets, allow for the analysis of the domain popularity, domain categories variation and page update frequency to plan when the classifier should be done, and allow for the generation of signatures out of users traffic in order to identify the visited URL with a classifier created previously.

The execution of an example method according to an embodiment of the invention is described herein below. For the execution of the example method, an HTTPS everywhere web where users connect to any website via HTTPS was assumed. Therefore, cleartext traffic exchanged between the user browser and the webservers was not accessible for the execution of the example method. Instead, only encrypted flows could be monitored. However, a hostname requested by a user could be inferred by observing the SNI in a client_hello message. In cases where SNI was not used, client queries to DNS (recall that DNS has no provisions for confidentiality) or simply a whois on the destination IP address revealed the hostname requested by the user.

For the execution of the example method, a simplified website model structure was used in which each website has a main page and a set of first level pages (i.e., the pages linked on the main page). For execution of the example method, pages of the website beyond the ones linked on the main page were not used. However, the results provided by the execution of the example method could be easily generalized to account for more complex website structures. For execution of the example method, it is assumed that a user visits one page at a time for each domain. This could be either the main page, or any of the first level pages. The eavesdropper tries to infer the page visited by the user and assigns to her profile the corresponding set of categories according to Google AdWords.

User profiling accuracy in an HTTPS everywhere web is dependent on assessing the difference between the user interest categories corresponding to a website main page (e.g., the user interest categories corresponding to www.nbcnews.com/) and the ones corresponding to any of its first level pages (e.g., the categories corresponding to www.nbcnews.com/politics/).

For the execution of the example method, a list of top websites returned by AdWords for each of its twenty-four first level categories were collected. Within each list, the one hundred most popular websites based on their rank by a web traffic data and analytics provider were selected. For each of the resulting 2400 websites, the URL of all the links available on the main page that remains within the same host were fetched. External links, such as the ones to CDNs, were not considered. Each of the collected URLs (which totaled more than 110,000 URLs) was submitted to the AdWords Display Planner to obtain a corresponding set of user interest categories.

Figure 3:
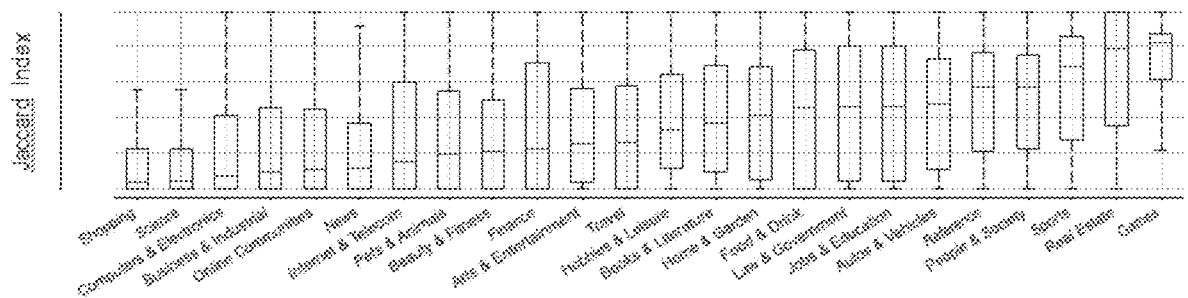
FIG. 3 shows a distribution of the Jaccard index among user interest categories assigned to the main page of a website and the categories assigned to its first level pages according to the execution of a method according to an embodiment of the invention.

FIG. 3 shows, for each of the twenty-four top level categories of AdWords, the distribution of the Jaccard index among the user interest categories assigned to the main page of a website and the categories assigned to its first level pages. A Jaccard index close to 1.0 indicates that simply assigning the user interest categories of the main page of the website to a user would result in the creation of a quite accurate profile regardless of the actual page the user is browsing within that website. A Jaccard index close to 0.0 indicates that assigning the user interest categories of the main page of the website to a user would result in the creation of a less accurate user profile.

FIG. 3 demonstrates great variance, depending on the main category of the website, in profiling accuracy based on assigning the user interest categories of the main page of the website to a user. For example, users visiting sports, real estate, or games websites could be profiled very accurately merely by knowing the website they are connected to. However, for users visiting any page within a website related to, e.g., shopping, computers & electronics or news, the user profile built by assigning the user interest categories of the main page is likely to be inaccurate.

For the execution of the example method, a traffic fingerprinting technique described by Panchenko et al. (A. Panchenko, L. Niessen, A Zinnen, and T. Engel, "Website Fingerprinting at the Internet Scale," in *Proc. Of NDSS '16*) was utilized. The traffic fingerprinting technique of Panchenko, which is one of the most accurate web fingerprinting framework to date, uses the size and the direction of each packet of a TCP connection. Therefore, the technique is robust against differences in bandwidth or congestions along the route. Panchenko et al. show that page fingerprinting is hard in an open-world scenario in which the client can browse any page outside of the set monitored by a network monitoring entity. However, the execution of the example method showed that webpage fingerprinting can be reasonably accurate in a closed-world scenario in which a network monitoring entity monitors all the pages that a client can possibly visit. This assumption is realistic in the scenario in which the example method was executed because the network monitoring entity knows the website requested by the user by obtaining the SNI in the client_hello message and infers which page she is browsing within that particular requested website.

For the execution of the example method, the features extracted from the traffic generated by downloading a page include a number of incoming packets and a number of outgoing packets, the total size of incoming packets and the total size of outgoing packets, and a trace defined over the size and the order of the observed packets. In particular, each URL was visited 50 times from an isolated machine with no additional applications being simultaneously executed and the transmitted packets were captured. Then, packets coming from hosts other than the one being modeled (e.g., advertisers, content delivery networks (CDNs), etc.) were filtered out. Finally, a signature was generated that was consistent with the number of outgoing packets, the number of incoming packets, the total transmitted bytes, the total received bytes, and the sizes of all individual transmitted packets. For execution of the example method, an SVM classifier with an RBF kernel parametrized with $\gamma \in$ [0.001, 0.01, 0.1, 1, 10, 100, 1000, 10000] and $c \in$ [0.001, 0.01, 0.1, 1, 10, 100, 1000, 10000] were used. For each monitored website, tcpdump (a well known packet analyzer for linux) was used to capture the traffic generated by fetching each of the first level pages fifty times and to measure the accuracy of the classifier using tenfold cross validation.

For the execution of the example method, nine websites having low Jaccard index values between the main page and the first level pages (see FIG. 3) were selected. During execution of the example method, a classifier was trained and its accuracy tested in three different scenarios: a PC using the Mozilla Firefox browser with cache and without cache, and a mobile device using the Google Chrome browser with cache enabled. In the latter scenario, the Android emulator was used during execution of the example method to fetch the pages from an emulated Nexus 5 using a built-in feature of the emulator to simulate the conditions of a 3G network.

Figure 4:
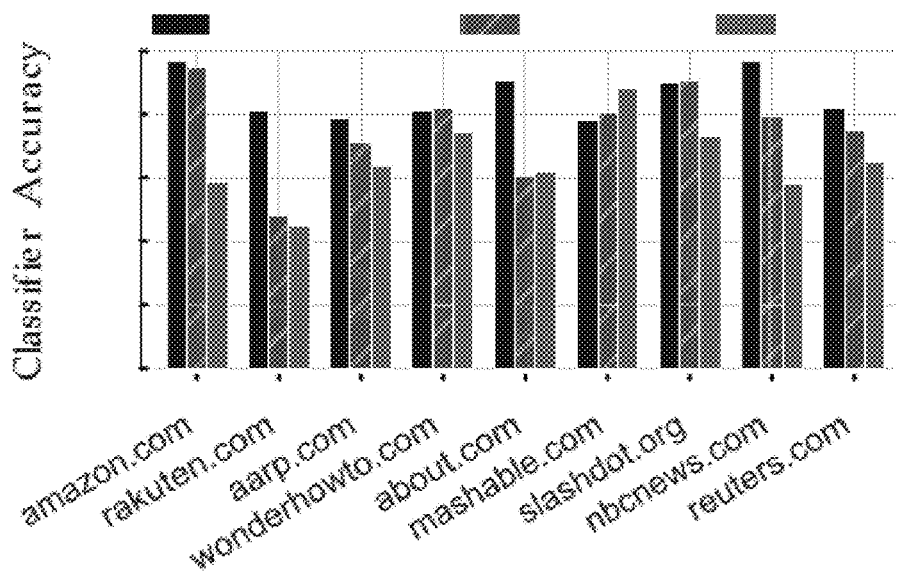
FIG. 4 shows the accuracy of a classifier websites in various scenarios according to the execution of a method according to an embodiment of the invention.

FIG. 4 shows the accuracy of the classifier for the nine websites in each one of the aforementioned scenarios. The execution of the example method produced the lowest accuracy for the PC with cache scenario when predicting pages of aarp.com (0.79), while the highest accuracy was produced when predicting pages of amazon.com (0.97). Caching inevitably hindered the accuracy of the classifier by 10.3% on average, but the average accuracy never dropped below 0.48. The accuracy decreased with caching because when parts of a page are in the local cache, the traffic trace available to the classifier becomes shorter and, therefore, more likely to be confused with that of another page. In the extreme case of a page whose elements are all in the cache, the resulting trace becomes totally indistinguishable from that of any other fully cached page. The mobile device scenario suffered from a similar issue, not only due to caching, but also as a result of mobile versions of a site typically being simpler than their desktop counterparts and therefore producing more similar traffic traces.

Figure 5A:
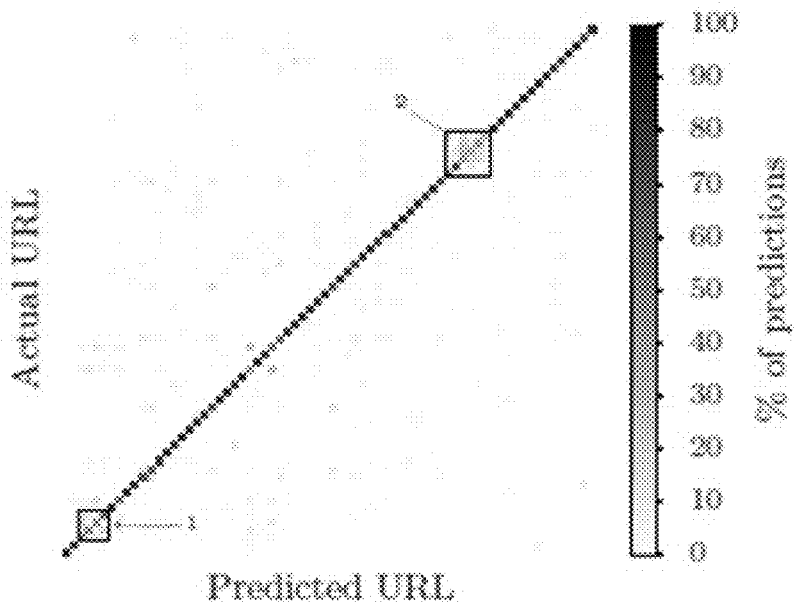
FIG. 5($a$) shows a confusion matrix for a website where pages are sorted lexicographically based on their URL according to the execution of a method according to an embodiment of the invention.
Figure 5B:
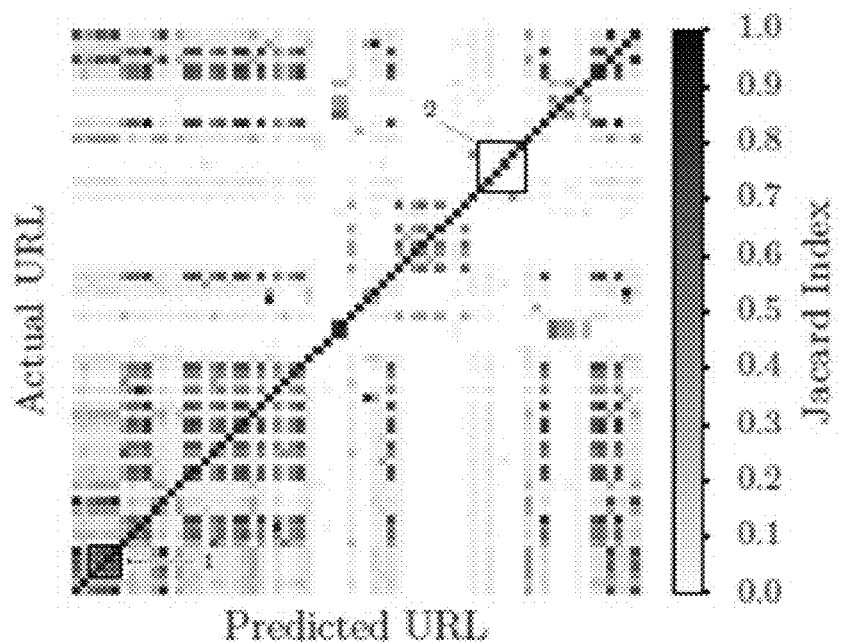

The effect of the accuracy of user interest classifiers generated through execution of the example method on the quality of user profiles was also investigated. FIG. 5(a) shows a confusion matrix for edition.cnn.com where pages are sorted lexicographically based on their URL. FIG. 5(b) shows the Jaccard index between any pair of first level pages for the same website (edition.cnn.com) for the same page sorting (lexicographically based on their URL). Due to the sorting, pages under the same branch of the website, say edition.cnn.com/style appear sequentially, in both matrices. FIG. 5(a) shows that when the classifier made a mistake, the output page tends to be close to the correct one. For example edition.cnn.com/style/arts is often misclassified as edition.cnn.com/style/fashion and vice versa. Such misclassification resulted because the features used to train the classifier looked at the structure of pages (e.g., the number and position of textboxes) rather than their content (e.g., the actual text). Therefore, when pages within the same branch of a website shared a similar structure, classification mistakes similar to the ones of FIG. 3(a) were observed.

When misclassification occurred, the amount of damage to user profiling accuracy depended on whether the user interest categories associated with the actually visited page and the user interest categories associated with the page output by the classifier overlap or not. For example, because of their similar structure, edition.cnn.com/asia/ is likely to be predicted as edition.cnn.com/africa/ by the classifier (see box 1 in FIG. 5(a)). However, given that the set of their user interest categories is very similar (see box 1 in FIG. 5(b)), the mistake of the classifier has very little impact on the quality of user profiling. Of course this is not always the case. For example the pages under edition.cnn.com/style/ (see box 2 in FIG. 5(a)) are likely to be confused with one another by the classifier. This, however, leads to high profiling error because different pages under the "style" branch of the website have little overlap in term of categories (see box 2 in FIG. 5(b)).

Figure 6:
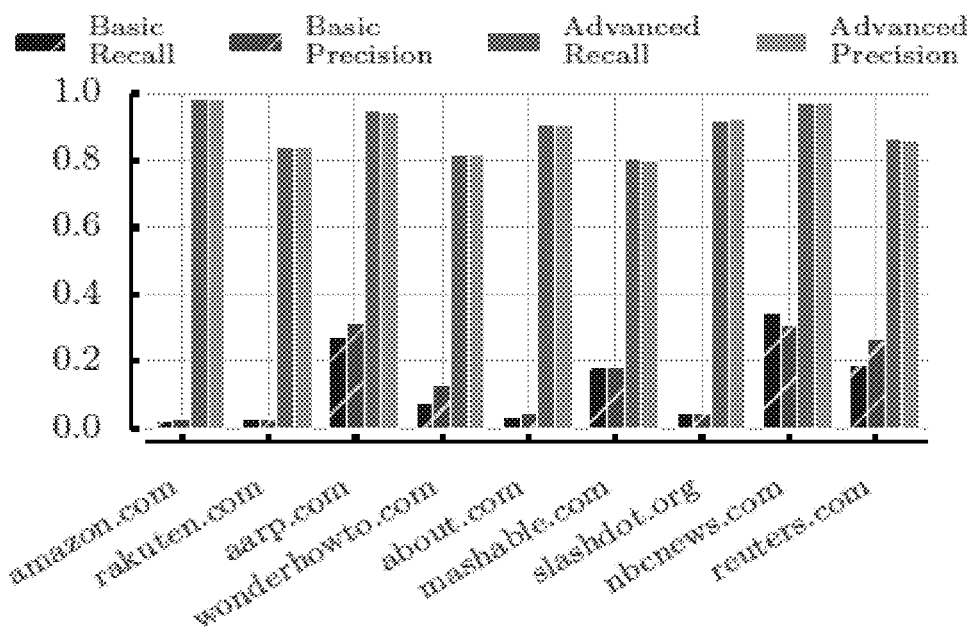
FIG. 6 depicts performance of different profiling techniques when monitoring selected websites according to the execution of a method according to an embodiment of the invention.

FIG. 6 depicts the performance of basic and the advanced profiling techniques when monitoring the nine selected websites having low Jaccard index values between the main page and the first level pages. Dashed bars show the precision and recall of the technique of assigning the user interest categories of the main page to each first level page described above in connection with FIG. 3. Solid bars show the precision and recall of the advanced profiling mechanism that leverages the web fingerprinting technique described above. User profiling leveraging web fingerprinting clearly outperforms the basic profiling technique.

The difference between the time when a classifier is trained and a time when pages are predicted can affect the prediction accuracy—particularly for very dynamic websites (e.g., news or online community websites). According to an embodiment, time can be discretized in epochs and website content can be assumed to change only from one epoch to the next. If the training data and the testing data are collected in the same epoch, the classifier can be said to be fresh. Otherwise, if the training data and the testing data are not collected in the same epoch, the classifier can be said to be stale. In an executed example method of an embodiment of the invention, epochs were defined as days, a classifier was trained over a snapshot of the website on a given day, and pages fetched throughout the following 6 days were predicted using the classifier.

A sensible difference in accuracy between a stale classifier and a fresh classifier was expected for dynamic pages where content changes every day (e.g., news websites). In the case of websites with static content, the difference between a stale classifier and a fresh classifier are expected to be less pronounced. To verify this, four websites with mostly static content (two corporate websites and two academic websites) were added to the nine selected websites having low Jaccard index values between the main page and the first level pages websites used in the executed example methods previously described.

Figure 7:
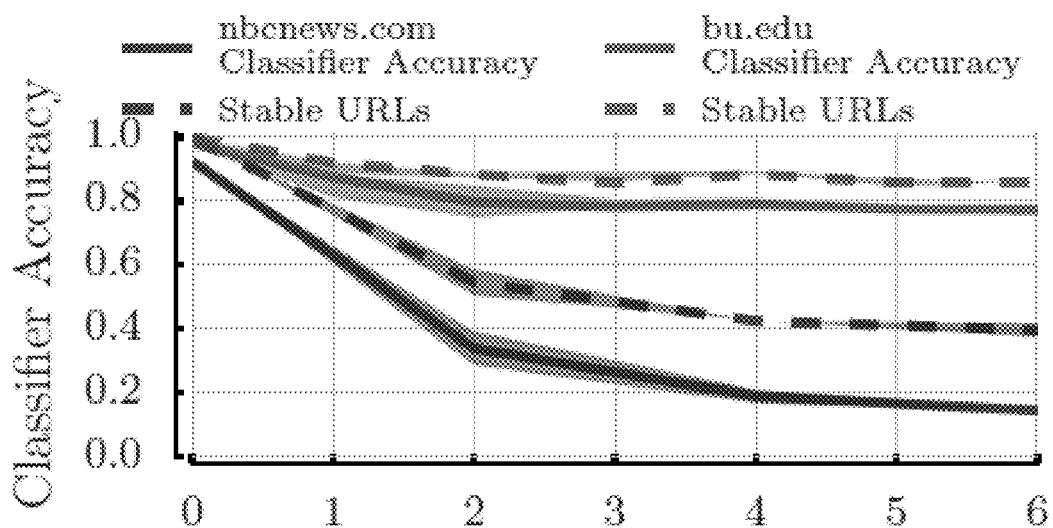
FIG. 7 shows the effect of staleness on the accuracy of the classifier for a static website and for a dynamic website according to an execution of a method according to an embodiment of the invention.

FIG. 7 shows the effect of staleness on the accuracy of the classifier for a static website and for a dynamic website according to execution of a method according to an embodiment of the invention. The dashed lines represent the percentage of first level pages that remain linked in the main page across days, while the solid ones represent the accuracy of the classifier. The accuracy of the classifier for the dynamic website decreased rapidly, while the accuracy for the static website decreased slowly during the first two days and then stabilized at around eighty percent accuracy. For both lines, the shadows denote the minimum and the maximum of the statistics.

In a real-world deployment, a network monitoring entity may not have the bandwidth required to refresh the classifier of each monitored website at every epoch. As described herein, an optimization problem for maximizing the profiling quality given a bandwidth constraint can be formulated.

A network entity is assumed to monitor a corpus of n websites $w^1, \ldots, w^n$. Website $w^i$ has a main page $p_0^i$ and $s^i$ 1-st level pages $p_1^i, \ldots, p_{s_i}^i$. We also use $C(p_j^i)$ to denote a set of user interest categories of page $p_j^i$. When browsing website $w^i$, a user may visit any page $p_j^i$, with $j=0, \ldots, s_i$. Since the connection is encrypted, no assumption is made regarding which are the most popular pages within $w^i$. If the user visits page $p_j^i$, the correct categories that should be assigned to that user when browsing $w^i$ are, therefore, $C(p_j^i)$. We consider any category in $C(p_j^i)$ that the profiler assigns to that user as a true positive. Similarly, any category not in $C(p_j^i)$ that the profiler assigns to that user is a false positive.

According to an embodiment of the invention, a network monitoring entity can learn $w^i$ from the client_hello message issued by the user browser and can assign the user interest categories of the main page $C(p_0^i)$ to that user. However, because of HTTPS, the baseline profiling system cannot tell which page $p_j^i$ was visited. If we denoted with $T^i$ and $F^i$ the true positive and the false positive, respectively, we have:

$$T^i = \frac{1}{s_i+1} \sum_{j=0 \ldots s_i} |c(p_0^i) \cap c(p_j^i)|$$

$$F^i = \frac{1}{s_i} \sum_{j=1 \ldots s_i} |c(p_j)\backslash c(p_0)|$$

A network monitoring entity can infer the page $p_j^i$ the user has fetched by looking at an encrypted traffic trace by using a classifier trained on a snapshot of $w^i$. As discussed previously herein, a freshness of the snapshot used to train the classifier can have an impact on its accuracy.

An expected number of true positives and an expected number of false positives can be denoted with a classifier that is $t_i$ epochs stale by $T_{t_i}^i$ and $F_{t_i}^i$, respectively. Thus we have:

$$T_{t_i}^i = \Sigma_{j=0 \ldots s_i} \pi(p_j^i, p_j^i) |c(p_j^i)| + \Sigma_{j=0 \ldots s_i} \Sigma_{l=0 \ldots s_i, l \neq j} \pi(p_j^i, p_l^i) |c(p_j^i) \cap c(p_l^i)|$$

$$F_{t_i}^i = \Sigma_{j=0 \ldots s_i} \Sigma_{l=0 \ldots s_i, l \neq j} \pi(p_j^i, p_l^i) |c(p_l^i) \backslash c(p_j^i)|,$$

where $\pi(p_j^i, p_l^i)$ denotes the probability of predicting page $p_j^i$ as $p_l^i$ (which depends on the freshness of the classifier).

Given an expected number of true and false positives, an available bandwidth budget B made available to a network monitoring entity at each epoch and a bandwidth $b^i$ required to refresh a classifier for a website $w^i$ can be defined. The popularity $u^i$ of website $w^i$ (i.e., the number of users that visit $w^i$ in an epoch) can also be defined.

Upon every epoch, the eavesdropper decides to spend the bandwidth budget B by training classifiers on fresh snapshots of a subset X of the monitored websites. If website $w^i$ is included in X, the available budget is reduces by $b^i$ and an expected number of correct categories assigned is $u^i \cdot T_0^i$, while an expected number of categories mis-assigned is $u^i \cdot F_0^i$. If website $w^i$ is not included in X, the budget remains untouched and the expected number of correctly assigned and mis-assigned categories is $u^i \cdot T_{t_i}^i$ and $u^i \cdot F_{t_i}^i$, respectively, assuming the most recent classifier for $w^i$ is $t_i$ epochs stale.

A selection of X, therefore, can attempt to maximize a number of true positives and to minimize a number of false negatives, while respecting the available budget.

Select $X \subseteq \{1, \ldots, n\}$ s.t. Max $\Sigma_{i \in X} u^i (T_0^i - F_0^i) + \Sigma_{i \notin X} u_i (T_{t_i}^i - F_{t_i}^i)$ Where $\Sigma_{i \in X} b^i \leq B$ If a classifier were never trained on $w^i$, we fall-back to the profiling technique of the naïve network monitoring entity so that the number of true positives is $u^i \cdot c(p_0^i)$ and the number of false positives is $|c(p_j^i) \backslash c(p_0^i)|$. The above problem resembles the well-known 0/1 knapsack problem with the only difference that items that are not selected add a non-zero value to the total gain.

A method according to an embodiment of the invention was executed to illustrate the workings and the value of the optimization described above. A simulation based on fifteen websites from previous sections was performed and the training bandwidth requirement and probabilities of the confusion matrices were empirically assessed, while a web traffic data and analytics provider was used to obtain the popularity of each website.

Figure 8:
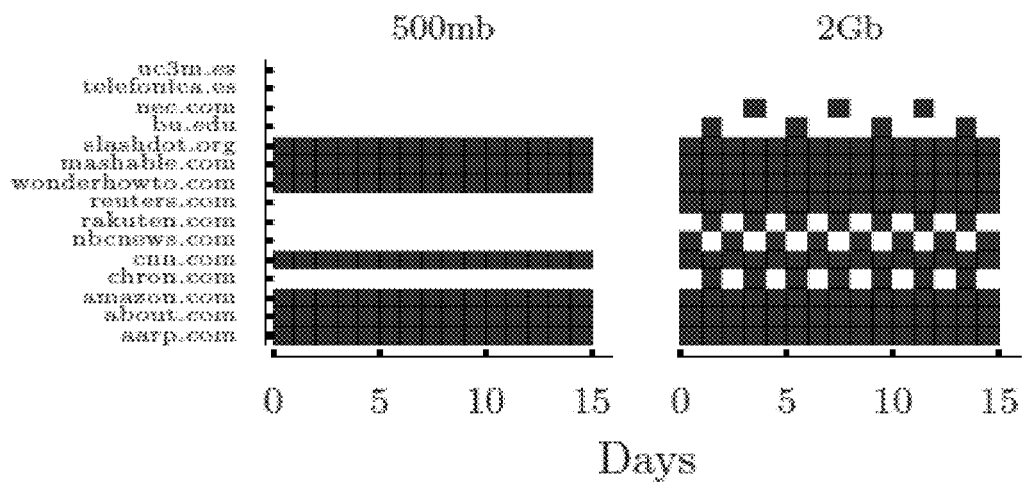
FIG. 8 shows an output of an optimization problem across fifteen days for two different bandwidth budgets according to the execution of a method according to an embodiment of the invention.

FIG. 8 shows an output of an optimization problem across fifteen days for two different bandwidth budgets according to the execution of a method according to an embodiment of the invention. In FIG. 8, a black box is used to mark a domain that is being selected for re-training on a particular day. FIG. 8 shows which domains are to be classified every day under two different budgets (500 Mb and 2 Gb, representing 10% and 40%, respectively of the budget needed to re-classify all sites every day). As can be seen from FIG. 8, bandwidth availability can strongly affect the daily classification pattern. In the case of a 500 Mb budget, the same set of websites are selected for classification every day. In the case of a 2 Gb budget, however, different websites compete for the available budget and thus end up being selected or skipped on different days. The actual resulting pattern depends on the interplay between website popularity, size, and dynamicity of content.

The small number of websites in the above example does not leave a lot of margin for profiling performance difference between optimizing only once versus optimizing every day. However, a larger example that includes 200 pages with a mix of popularities, content dynamicity, and size have been analyzed and demonstrated that in more complex settings, the difference between optimizing only once vs. every day can be substantial.

Figure 9:
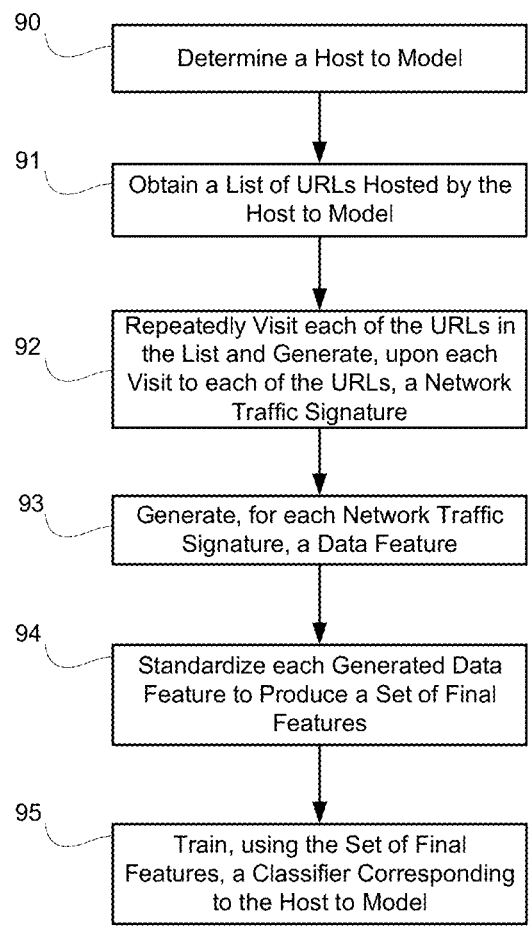
FIG. 9 is a flow chart depicting a process employed during the training phase according to an embodiment of the invention.

FIG. 9 is a flow chart depicting a process employed during the training phase according to an embodiment of the invention. The process employed during the training phase can be executed, as a whole, by the training phase subsystem depicted in FIG. 1. Individual steps of the process employed during the training phase can be executed by components of the training phase subsystem, e.g. the Signature Generator, the Classifier Generator, the Budget Planner, the URL Categorizer, and the Popularity Estimator.

At 90, a host to model is determined, i.e. a host for which to generate a classifier for is determined. The host to model can be determined based on statistics that identify the most popular domains and hosts of those domains, which can be obtained from a network analyzer. The determination of the host to model can be carried out by the Budget Planner of the training phase subsystem of FIG. 1. The determination of the host to model can take into account the costs associated with the generation of a classifier for a particular host, the diversity of the user interest categories associated with the URLs hosted by a particular host, and the frequency with which a particular host is updated. The determination of a host to model at 90 can be performed as a part of a determination, by the Budget Planner, of a plurality of hosts to model. The determination of a plurality of hosts to model by the Budget Planner can be the result of the Budget Planner solving an optimization problem that aims to correctly assign user interests to user interest profiles and that accounts for the impact of the popularity of a plurality of domains and hosts of those domains, the diversity of user interest categories associated with URLs hosted by a plurality of hosts, and the frequency with which the web resources referenced by the URLs hosted by a plurality of hosts are updated.

At 91, a list of URLs hosted by the host to model (i.e. a list of URLs that reference web resources hosted by the host to model) is generated. The list of URLs hosted by a host to model can be generated by the Signature Generator of the training phase subsystem of FIG. 1. The list of URLs hosted by the host to model can include only a subset of all of the URLs hosted by the host to model. For example, the list of URLs hosted by the host to model that is obtained at 91 can be obtained by visiting an index page of the host to model and obtaining a list of URLs that exist in the first level of a web page graph corresponding to the host to model.

At 92, each of the web resources referenced by each of the URLs hosted by the host to model is repeatedly retrieved and a network traffic signature is generated upon each retrieval. The web resources can be retrieved by and the network traffic signatures generated by the Signature Generator of the training phase subsystem of FIG. 1. Network traffic signatures can be generated by logging the packets transmitted to and from the host to model during web resource retrieval. Generating network traffic signatures can also include logging the packets transmitted to or from third party domains such as content delivery networks (CDNs) during web resource retrieval. Logging the packets transmitted to and from the host to model and transmitted to and from third party domains can include recording the size and direction of packets, the source and destination of packets, and the interarrival times between packets. Each generated network traffic signature can include all or a subset of the information derived from logging packets during web resource retrieval, e.g. size, source, destination, and direction of packets and the interarrival times between packets. Each generated network traffic signature can be stored at a processor readable storage medium and mapped to a particular URL hosted by the host to model.

At 93, a data feature is generated for each network traffic signature. Each generated data feature can be stored at a processor readable storage medium and mapped to a particular URL hosted by the host to model. Each data feature can be, e.g., a set of positive and negative numbers (where positive numbers represent the size of data packets transmitted to the host to model and negative numbers represent the size of data packets transmitted from the host to model), ordered according to the time at which they are received by a particular vantage point, that can be interpreted as a curve.

At 94, each of the generated data features is standardized to produce a set of final features for the host to model. The generated data features can be standardized by, e.g., determining a fixed number of points for a curve by which the features of 93 are interpreted and interpolating the curves by which the features of 93 are interpreted then applying a max-min normalization of the resulting interpolated curves.

At 95, the set of final features for the host to model can be used to train a classifier corresponding to the host to model. The classifier corresponding to the host to model can be trained using standard machine learning techniques such as Support Vector Machines (SVM) or using other techniques such as linear regression. The classifier can be a processor or processor module or a plurality of processor or processor modules configured to identify a URL from a signature of network traffic produced by the retrieval of a resource referenced by that URL.

Figure 10:
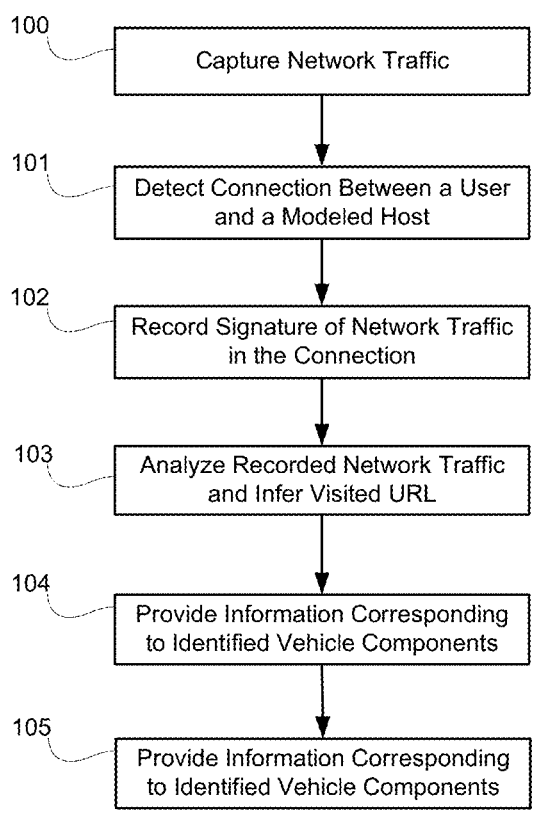
FIG. 10 is a flow chart depicting a process employed during the online phase according to an embodiment of the invention.

FIG. 10 is a flow chart depicting a process employed during the online phase according to an embodiment of the invention. The process employed during the online phase can be executed, as a whole, by the online phase subsystem depicted in FIG. 2. Individual steps of the process employed during the online phase can be executed by components of the online phase subsystem, e.g. the Signature Extractor, the Signature Classifier, the URL Categorizer, and the User Profiler.

At 100, network traffic is captured. Network traffic can be captured by the Signature Generator of the online phase subsystem depicted in FIG. 2. The network traffic can be captured using a capturing device. Once the network traffic has been captured, the network traffic can be split into different domains in order to obtain packets related to every connection.

At 101, a connection between a user and a modeled host is detected. The detection of the connection between a user and a modeled host can be performed, for example, by intercepting DNS requests, by recognizing an IP address related to a modeled host from a list of IP addresses related to modeled hosts, or by reading SNI information in HTTPS packets.

At 102, a signature of the network traffic in the connection between the user and the modeled host is recorded. The signature of the network traffic of the connection between the user and the modeled host can be recorded by the Signature Generator of the online phase subsystem depicted in FIG. 2. The recorded signature of the network traffic in the connection between the user and the modeled host can be generated by logging packets transmitted to and from the modeled host. Generating network traffic signatures can also include logging packets transmitted to or from third party domains such as content delivery networks (CDNs). Logging the packets transmitted to and from the modeled host and transmitted to and from third party domains can include recording the size and direction of packets, the source and destination of packets, and the interarrival times between packets. The recorded network traffic signature can include all or a subset of the information derived from logging packets during web resource retrieval, e.g. size, source, destination, and direction of packets and the interarrival times between packets. The recorded network traffic signature can be stored at a processor readable storage medium.

At 103, the recorded network traffic signature is analyzed and a visited URL is inferred. The recorded network traffic signature is analyzed by the Signature Classifier of the online subsystem depicted in FIG. 2. In analyzing the recorded network traffic signature, the Signature Classifier receives the recorded network traffic signature as an input and infers an exact URL that was most likely visited by a user in producing the network traffic from which the recorded network traffic signature was taken. Inferring an exact URL that was most likely visited can include comparing a feature of the recorded network traffic signature with features corresponding to network traffic signatures generated by retrieving web resources referenced by URLs hosted by the modeled host.

At 104, a user interest category is determined from the inferred URL. The user interest category can be determined from the URL by the URL categorizer of the online subsystem depicted in FIG. 2. At 105 the determined user interest category is assigned to a user profile. The determined user interest category can be assigned to a user profile by the User Profiler of the online subsystem depicted in FIG. 2.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for determining an identity of a uniform resource locator (URL) visited by a user from a vantage point in a network in which network traffic is encrypted, the method comprising:
   determining a host to model;
   generating a list of URLs hosted by the host to model that exist in a first level of a web page graph corresponding to the host to model by visiting an index page of the host to model;
   repeatedly retrieving web resources referenced by the list of URLs hosted by the host to model, including first level pages, and generating a network traffic signature upon each retrieval;
   generating a data feature for each of the generated network traffic signatures; and
   training, using the generated data features, a classifier corresponding to the host to model, wherein the classifier is configured to determine an identity of the visited URL, including first level page information, from a signature of network traffic produced by the retrieval of a resource referenced by the visited URL.

2. The method of claim 1, wherein the generated network traffic signatures include a size and direction of packets transmitted during the repeatedly retrieving web resources referenced by the list of URLs hosted by the host to model.

3. The method of claim 1, further comprising standardizing each generated data feature to produce a set of final features for the host to model, wherein the training, using the generated data features, a classifier corresponding to the host to model comprises training the classifier with the set of final features.

4. The method of claim 1, further comprising:
   capturing network traffic of a connection between the user and the host to model, wherein the connection between the user and the host to model corresponds to retrieval of the resource referenced by the visited URL by the user;
   recording a signature of the captured network traffic; and
   analyzing, by the classifier, the recorded signature of the captured network traffic to determine the identity of the visited URL.

5. The method of claim 4, wherein the signature of the captured network traffic includes a size and direction of packets transmitted over the connection between the user and the host to model.

6. The method of claim 5, wherein the signature of the captured network traffic further includes interarrival times between packets transmitted over the connection between the user and the host to model.

7. The method of claim 4, wherein the analyzing, by the classifier, the recorded signature of the captured network traffic to determine the identity of the visited URL comprises comparing a feature of the recorded signature with features corresponding to the generated network traffic signatures.

8. The method of claim 4, further comprising determining a user interest category corresponding to the identity of the visited URL.

9. The method of claim 8, further comprising assigning the determined user interest category to a user profile corresponding to the user.

10. The method of claim 1, wherein determining a host to model comprises analyzing the popularity and diversity of a plurality of hosts.

11. The method of claim 1, wherein the data feature for each of the generated network traffic signatures is a set of positive and negative numbers, wherein the positive numbers represent the size of data packets transmitted to the host to model and the negative numbers represent the size of data packets transmitted from the host to model.

12. The method of claim 11, wherein the set of positive and negative numbers is interpreted as a curve.

13. The method of claim 1, wherein the positive and negative numbers are ordered according to the order at which the packets to which they correspond were received by the vantage point.

14. The method of claim 1, wherein the training, using the generated data features, a classifier corresponding to the host to model comprises using Support Vector Machines (SVM) to train the classifier.

15. The method of claim 1, wherein the training, using the generated data features, a classifier corresponding to the host to model comprises using linear regression to train the classifier.

16. The method of claim 1, further comprising determining a user interest category corresponding to the identity of the visited URL, and assigning the determined user interest category to a user profile corresponding to the user such that the user profile is based at least in part on the user interest category corresponding to one of the first level pages of the host to model.

17. The method of claim 16, wherein the user profile includes user interest categories corresponding to main pages and user interest categories corresponding to first level pages.

18. The method of claim 16, further comprising assessing a difference between a user interest category corresponding to a main page of the host to model and the user interest category corresponding to one of the first level pages of the host to model.

19. The method of claim 1, wherein the network is an hypertext transfer protocol secure (HTTPS) everywhere web.

20. A non-transitory computer readable medium having processor-executable instructions stored thereon for determining an identity of a uniform resource locator (URL) visited by a user from a vantage point in a network in which network traffic is encrypted, the processor-executable instructions, when executed, facilitating performance of the following:

determining a host to model;

generating a list of URLs hosted by the host to model that exist in a first level of a web page graph corresponding to the host to model by visiting an index page of the host to model;

repeatedly retrieving web resources referenced by the list of URLs hosted by the host to model, including first level pages, and generating a network traffic signature upon each retrieval;

generating a data feature for each of the generated network traffic signatures; and training, using the generated data features, a classifier corresponding to the host to model, wherein the classifier is configured to determine an identity of the visited URL, including first level page information, from a signature of network traffic produced by the retrieval of a resource referenced by the visited URL.

* * * * *